United States Patent
Baranowski et al.

[19]

[11] Patent Number: 6,157,173

[45] Date of Patent: Dec. 5, 2000

[54] CIRCUIT AND METHOD FOR SHARING CURRENT BETWEEN A PORTABLE DEVICE AND A BATTERY CHARGER

[75] Inventors: Robert Baranowski; Clayton R. Karmel, both of San Diego, Calif.

[73] Assignees: Sony Corporation, Tokyo, Japan; Sony Electronics, Inc., Park Ridge, N.J.

[21] Appl. No.: 09/237,835

[22] Filed: Jan. 27, 1999

[51] Int. Cl.[7] .................................................. H02J 7/04
[52] U.S. Cl. ........................ 320/152; 320/163; 455/450; 363/144
[58] Field of Search ............................ 455/450; 363/144; 320/152, 163

[56] References Cited

U.S. PATENT DOCUMENTS

| | | | |
|---|---|---|---|
| 5,539,299 | 7/1996 | Fernandez et al. | 320/163 |
| 5,569,550 | 10/1996 | Garrett et al. | 429/7 |
| 5,583,415 | 12/1996 | Fernandez et al. | 320/152 |
| 5,602,460 | 2/1997 | Fernandez et al. | 320/152 |
| 5,656,876 | 8/1997 | Radley et al. | 307/150 |
| 5,856,737 | 1/1999 | Miller et al. | 436/501 |
| 5,925,942 | 7/1999 | Theobald | 307/125 |
| 5,949,213 | 9/1999 | Lanni | 363/144 |
| 6,016,047 | 1/2000 | Notten et al. | 320/137 |
| 6,018,229 | 1/2000 | Mitchell et al. | 320/112 |

*Primary Examiner*—Shawn Riley
*Assistant Examiner*—Pia Tibbits
*Attorney, Agent, or Firm*—Ronald P. Kananen; Rader, Fishman & Grauer

[57] ABSTRACT

A power accessory for apportioning electrical current between an electronic device and a rechargeable battery used in connection with the device includes two current limiting circuits. The first current limiting circuit limits the current supplied to the device to the peak current that device may demand. Any remaining current from the first current limiting circuit is passed through the second current limiter to the recharge the battery based on a charging algorithm. When the battery is fully charged, the second current limiting circuit stops providing current to the battery.

20 Claims, 4 Drawing Sheets

CIRCUIT AND METHOD FOR SHARING CURRENT BETWEEN A PORTABLE DEVICE AND A BATTERY CHARGER

FIELD OF THE INVENTION

The present invention relates to the field of portable, battery-operated devices that incorporate battery chargers to periodically recharge the battery pack powering the device. More particularly, the present invention relates to a circuit and method for sharing current from an outside power source between the operation of a portable device and the recharging of its battery.

BACKGROUND OF THE INVENTION

Many portable electronic devices contain battery packs that can power the device when the user is away from home and office, and cannot plug the device into an external power source such as a common electrical wall outlet. Most such devices also include an associated or internal battery charger that will recharge the battery pack when a power cord is connected to the device and plugged into an electrical outlet. Examples of such portable electronic devices are wireless telephones and laptop computers.

When the battery pack is depleted and the user plugs the device into an external power source, e.g., an electrical outlet, the user may also wish to use the device while the battery is recharging. As a result, the current from the electrical outlet must be shared to both power the device for immediate use and recharge the depleted battery pack. However, as battery capacities increase along with the power consumption demands of portable devices, it becomes increasingly difficult to supply adequate current to run the device and to rapidly recharge the battery. This difficulty is further complicated by the need to reduce the physical size of power accessories such as the power cord and transformer with which the device is plugged into an electrical outlet.

In the cellular telephone environment, the need to share electrical current between the phone and the charger has been addressed in a number of ways. For example, in one type of phone, all the current is supplied to the phone. The phone monitors the amount of current it needs and intelligently allocates some of the remaining current to recharge the battery. This allows the phone to always have the current it needs to operate.

However, having the phone allocate the current has the following disadvantages. Hardware and programming must be added to the phone so that it can monitor and allocate current. This increases the cost of the phone. Moreover, not all the available current is consistently used and the battery cannot be charged without the phone.

Another approach is to supply all the current to the battery charger and require that the phone run off the battery while the battery is being charged. This allows all the available current to be consistently utilized, does not require additional current-allocation hardware and programming in the phone itself and allows the battery charger to be designed to charge the battery even without the phone present.

On the other hand, this approach will not allow the phone to operate if the battery is extremely depleted. Moreover, the maximum charging current tolerated by the battery must meet or exceed the peak current needed by the phone. If the maximum current tolerated by the battery is less than the peak current needed by the phone, a battery charger suitable for the phone will overpower the battery, and using a charger suited to the battery will leave the phone under-powered.

Consequently, there is a need in the art for a method and apparatus of efficiently sharing a current between an electronic device and a battery charger that avoids the problems inherent in the prior art described above.

SUMMARY OF THE INVENTION

It is an object of the present invention to meet the above-described needs and others. Specifically, it is an object of the present invention to provide a method and apparatus that efficiently and safely allocates a current between an operating electronic device and a recharging battery. It is another object of the present invention to provide a method and apparatus of allocating a current between an operating electronic device and a recharging battery that does not require expensive hardware or programming within the device itself and which allows the battery to recharge even if the electronic device is not present.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a power accessory for an electronic device, such as a wireless telephone, and a battery pack. The power accessory includes a first current limiting circuit connected between a power source and the electronic device; and a second current limiting circuit connected between the power source and the battery pack. The first current limiting circuit allows the electronic device to pull current up to a peak current needed by the electronic device. The second current limiting circuit provides remaining current to recharge the battery pack. Preferably, the current limit of the first current limiting circuit is different and greater than the current limit of the second current limiting circuit.

The power source preferably includes an AC/DC converter connected to an AC current source such as a common electrical wall outlet. The AC/DC converter provides the direct current needed to operate the electronic device and to recharge the battery.

To maximize the life cycle of the battery, the second current limiting circuit controls the current to the battery according to a predetermined charging algorithm. This preferably includes interrupting the current passing to the battery when the battery is fully charged.

The present invention also encompasses a method of apportioning current between an electronic device and a recharging battery used in conjunction with the electronic device. The method includes the steps of limiting a first current drawn by the electronic device with a first current limiter to a peak current required by the device; and providing to the battery, through a second current limiter, a second current from current remaining after the first current is drawn. The first and second currents are derived from a supply current, and the method of the present invention includes providing that supply current to both the first and second current limiters.

To extend the life cycle of the battery, the method includes the steps of monitoring the charging of the battery; and interrupting the flow of the second current to the battery when the battery is fully charged. This monitoring is accomplished by determining that the battery is fully charged when a voltage of the battery is above a predetermined threshold;

the second current falls below a predetermined threshold; and the first current limiter is not limiting the first current.

The present invention also encompasses a power accessory for sharing current between two or more loads. This accessory includes a first current limiting circuit connected between a power source and a first load; and a second current limiting circuit connected between the first current limiting circuit and a second load. The first current limiting circuit allows the first load to pull current up to a peak current needed by the first load, and the second current limiting circuit provides remaining current to the second load. The first and second loads may both be electronic devices. Alternatively, the first and second loads may both be recharging battery packs.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Figure 1:
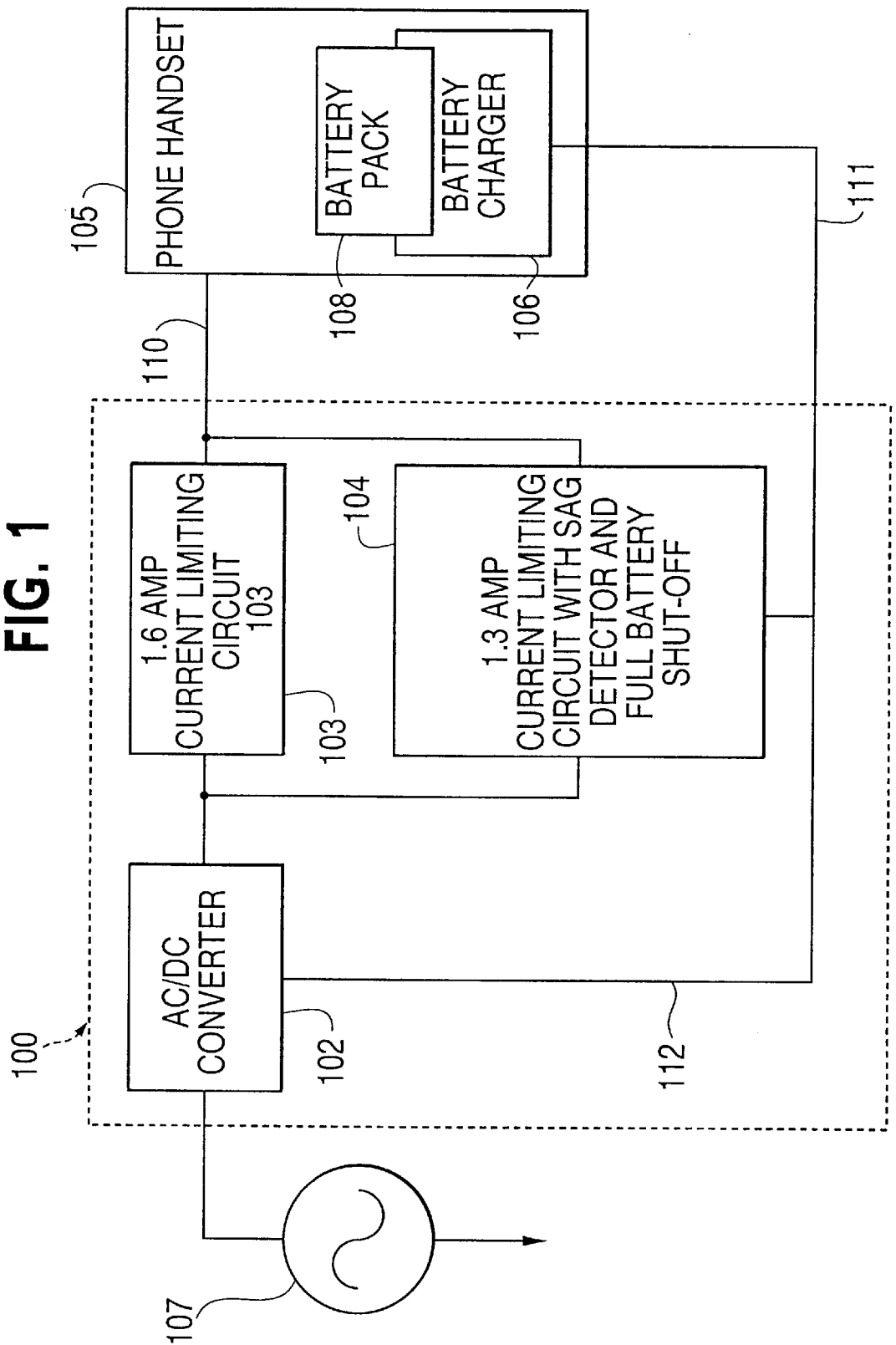
FIG. 1 is block diagram of a circuit according to the present invention.

Using the drawings, the preferred embodiments of the present invention will now be explained. FIG. 1 shows a specific example of the principles of the present invention employed in a circuit for powering a wireless phone. However, it will be understood that the present invention is not limited to this or any other single example.

As shown in FIG. 1, a power accessory 100 is used to provide power from an AC power source 107, such as an electrical wall outlet, to a wireless phone handset 105 and a battery pack 108. The battery pack 108 can be used to power the handset 105.

The power accessory 100 has two outputs. The first 110 can provide electrical current directly to the phone handset 105 so that the handset 105 can operate without using the battery pack 108. The power accessory 100 also has a connection 111 to the battery pack 108 so that current can be independently provided for recharging the battery pack 108.

While FIG. 1 illustrates the battery pack 108 as part of the phone handset 105, the battery pack 108 can be removed from the handset 105 or may be separate from the handset 105. In this way, the power accessory 100 can be used to provide current from power source 107 to the battery pack 108 even if the phone handset 105 is not present.

The power accessory 100 supplies, at most, 1.6 Amps at 4.5 Volts. The handset 105 does not pull more than 1.6 amps during operation. The battery pack 108 is preferably a graphite anode lithium ion battery pack with a charge termination at 4.2 Volts. The ideal charging current for the battery pack 108 is 1.3 Amps plus or minus 100 mA.

The circuitry of the power accessory 100 employs the principles of the present invention to provide the optimum division of current between the handset 105 and the battery 108. As shown in FIG. 1, the circuitry of the power accessory includes an AC/DC converter 102 that is connected to the AC power source 107. The DC current output by the converter 102 is provided to the first current limiting circuit 103. The output of the first current limiting circuit 103 is connected to the input of the second current limiting circuit 104 through connection 113.

The first current limiting circuit 103 provides a small voltage drop between the input and the output for currents less than 1.6 Amps. At 1.6 Amps, the voltage difference across the first current limiting circuit 103 will increase substantially to limit the current passed to 1.6 Amps.

The voltage differential across the circuit 103 will decrease when the current load decreases. A foldback circuit (not shown) can be added to the current limiting circuit 103 to lower the current limit as the output voltage decreases, thereby creating a short circuit protection.

The second current limiting circuit 104 acts as a battery charger and substantially limits the current passed to 1.3 Amps for recharging the battery pack 108. This circuit 104 should not require reverse current protection. As long as the handset 105 draws less current than the limit of the first current limiter 103, i.e., 1.6 Amps, an equilibrium state will be attained where current flows into both the battery pack 108 and the handset 105.

In this way, the handset 105 can receive as much current as needed up to its peak requirement of 1.6 Amps. The additional current is used by the battery charger 104. Thus, all the available current is consistently used and the distribution of current between the handset 105 and the recharging battery pack 108 is optimized.

The output of the second current limiter 104 is also provided through a feedback loop 112 to the converter 102. This feedback loop 112 will keep the voltage output of the converter 102 within a predetermined small window around 4.2 volts to protect the battery 108.

If there is some transient condition that pulls current from the battery pack 108, a series diode (not shown) can be added to the second current limiting circuit 104. This would require the AC/DC converter 102 to output a slightly higher voltage, increasing the required power output of the power accessory 100, but all other operations would remain as shown.

The current limiter 104 is also provided with an additional function that breaks the current path between the converter 102 and the battery pack 108 when the battery 108 is fully charged. This is accomplished by monitoring the battery voltage, the charge current and the voltage sag across the first current limiting circuit 103. The second current limiting circuit 104 detects the sag across the first current limiting circuit 103 by comparing the voltages on connections 114 and 113. If, for example, the battery voltage is higher than a predetermined threshold of about 4 Volts, the charge current is less than about 10 mA, and the current limiter 103 is not limiting the current passed, then the battery 108 is considered fully charged and the charger 104 is turned off, meaning that the current path between the converter 102 and the battery pack 108 is interrupted.

This interruption of current flow is preferably accomplished by driving high the gate of a MOSFET (See FIG. 3) which is part of the second current limiter 104. The transistor is then latched in the off state until the battery voltage falls below a predetermined threshold or the battery 108 is removed from the charger 104. Turning off the charger 104 when the battery 108 is fully charged extends the life cycle of the battery 108.

Parenthetically, the ideal cutoff algorithm for recharging a battery pack is to measure the charge current pulled by the charger. However, this is frequently impractical in conventional applications. Therefore, the power accessory 100 may preferably charge the battery while simultaneously providing current to the phone handset 105 for a predetermined period of time after the battery has been indicated as achieving "full voltage" to insure that the battery pack 108 is fully charged.

The DC voltage that is output from the AC/DC converter 102 should fall into a small window around 4.2 volts plus the saturation voltages of both the current limiting circuits 103 and 104. When the first current limiter 103 is not limiting current and the second current limiter 104 is saturated, the DC voltage at the battery 108 is regulated to 4.2 volts. During charging when the battery voltage is below full charge, the AC/DC voltage output should be limited to the highest possible voltage within the given small window. The feedback 112 between the second current limiter 104 and the converter 102 will try to drive the voltage output of the converter 102 to its maximum.

Figure 2:
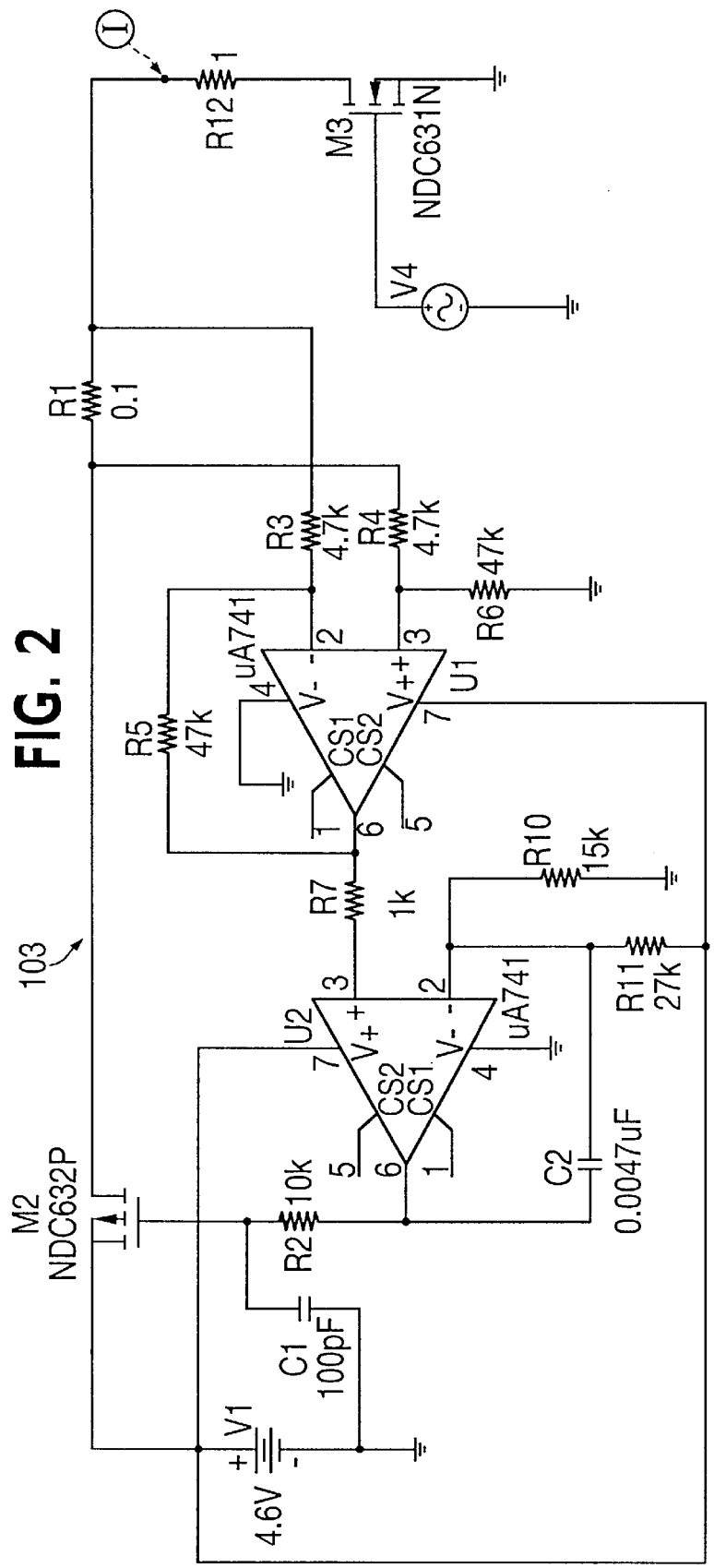
FIG. 2 is a circuit diagram of a first current limiting circuit according to the present invention.

FIG. 2 is a circuit diagram of a preferred embodiment of the first current limiting circuit 103. A transistor M2 is used as a pass device for the voltage input from the AC/DC converter 102. The output of an integrator U2 is connected through a resistor R2 to the gate of the transistor M2. A capacitor C1 is connected between the gate of the transistor M2 and ground to keep the transistor M2 from switching states too quickly.

The output of a differential amplifier U1 is connected through a resistor R7 to the plus input of the integrator U2. The minus input of the integrator U2 is connected through a capacitor C2 to the output of the amplifier U2. The integration of integrator U2 is done by capacitor C2. The differential gain of amplifier U1 is set by resistors R3, R4, R5 and R6.

The circuit 103 functions, in general, by keeping transistor M2 turned on just enough to keep the output of the differential amplifier U1 equal to the control voltage defined by resistors R10 and R11. Therefore, with each current pulse, the output of amplifier U1 increases until it exceeds the control voltage. This brings the gate of the transistor M2 high. The integrator U2 allows the current spike to pass before clamping the current at 1.6 Amps. As the current falls, the gate of the MOSFET M2 returns to low.

Figure 3:
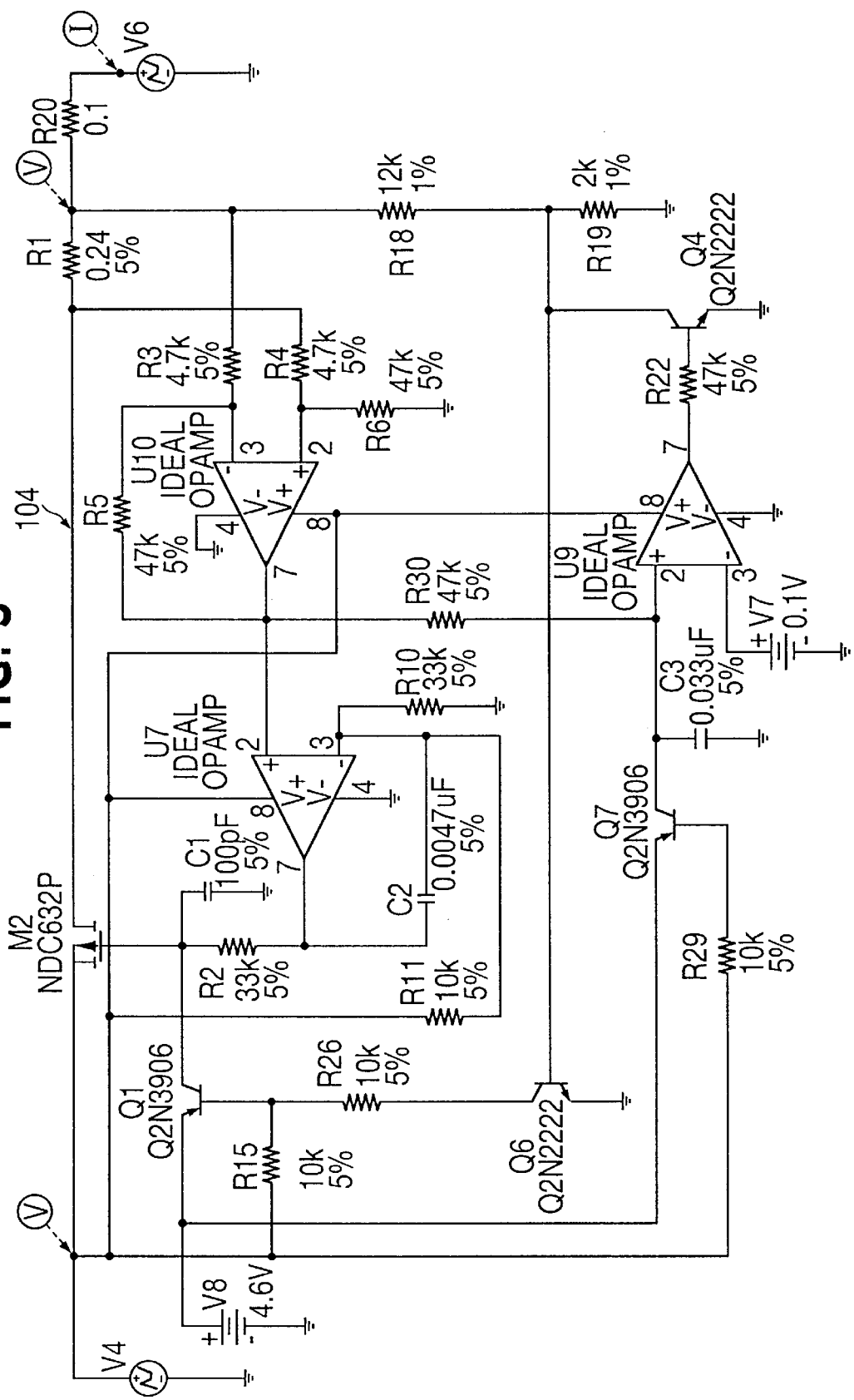
FIG. 3 is a circuit diagram of a second current limiting circuit according to the present invention.
Figure 4:
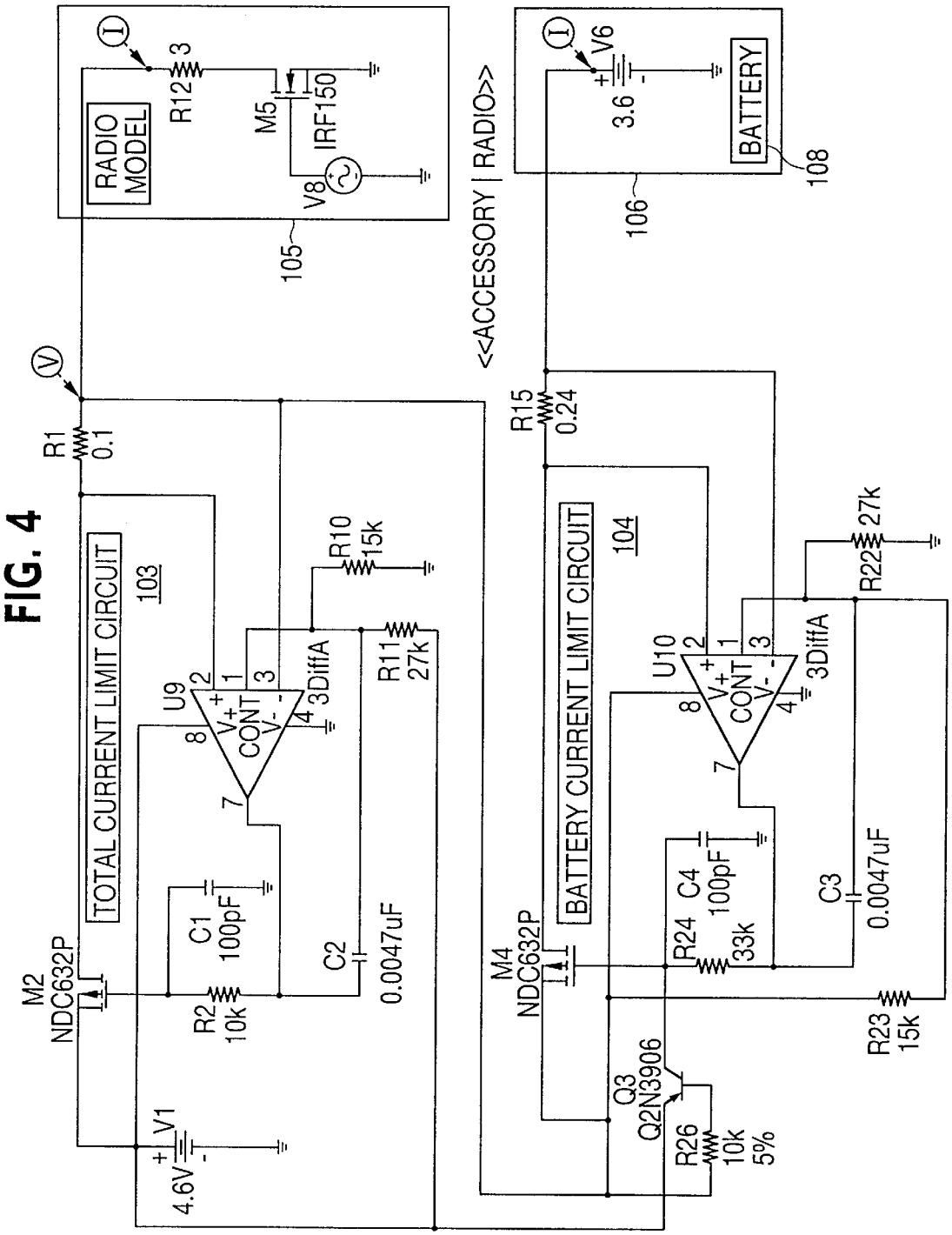

FIG. 3 is a circuit diagram of the second current limiter 104. The second current limiter 104 operates much like the first limiter 103 shown in FIG. 2, but adds the function of switching itself off when the battery is fully charged. In FIG. 3, the differential amp U10 and op amp U7 correspond in function to the differential amp U1 and integrating op amp U2 of FIG. 2.

Transistor Q1 detects the voltage sag in the first current limiting circuit 103. When a sag is present, the gate of the MOSFET Q1 is driven high. The gate of Q1 is also driven high when Q6 turns on. If the output of the differential amp U10 goes below, for example, 0.1 volts, i.e., a very low charging current, and the battery voltage is above, for example, 3.9 volts, and the first current limiter 103 is not sagging, then the base of transistor Q6 goes high and the base of the transistor Q1 goes low. This brings the gate of the transistor M2 high, thereby shutting off the flow of current to the battery pack 108. The charging current remains at zero until the battery voltage drops below the 3.9 Volt threshold.

The charging current flowing through the second current limiter 104 decreases as the input voltage to the circuit 104 decreases. This is achieved by referencing the current control voltage of the output of the first current limiter 103 rather than that of its input. Accordingly, as shown in FIG. 1, the second current limiting circuit 104 may be connected to the output of the first current limiting circuit 103.

While the example illustrated in FIGS. 1 to 3 is that of the present invention applied to a wireless telephone, the principles of the present invention have much wider application. The scheme of the present invention can be used in any application that requires a power accessory to supply current to a device in parallel with a battery and battery charger. Additionally, the present invention can be used in a battery charger that is charging two different battery packs and must optimize the current supplied to charge each pack.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A power accessory for an electronic device and a rechargeable battery comprising:
    a first current limiting circuit connected between a power source and said electronic device; and
    a second current limiting circuit connected between said first current limiting circuit and said battery;
    wherein said first current limiting circuit allows said electronic device to pull current up to a peak current needed by said electronic device, and said second current limiting circuit provides remaining current to said battery to recharge said battery.

2. The power accessory of claim 1, wherein said power source comprises an AC/DC converter connected to an AC current source.

3. The power accessory of claim 1, wherein said second current limiting circuit controls said current to said battery based upon a pre-determined charging algorithm.

4. The power accessory of claim 1, wherein said second current limiting circuit interrupts the current passing to said battery when said battery is fully charged.

5. The power accessory of claim 1, wherein said electronic device is a wireless telephone unit.

6. The power accessory of claim 1, wherein a current limit of said first current limiting circuit is different and greater than a current limit of said second current limiting circuit.

7. A method of apportioning current between an electronic device and a charging battery used in conjunction with said electronic device, the method comprising:
    limiting a first current drawn by said electronic device with a first current limiter to a peak current required by said device; and
    providing to said battery, through a second current limiter, a second current from current remaining after said first current is drawn.

8. The method of claim 7, further comprising providing a supply current to both said first and second current limiters.

9. The method of claim 7, further powering a wireless telephone with said first current.

10. The method of claim 7, further comprising:
    monitoring the charging of said battery;
    controlling said second current to said battery based on a charging algorithm; and
    interrupting said second current to said battery when said battery is fully charged.

11. The method of claim 10, wherein said monitoring further comprises determining that said battery is fully charged when:

a voltage of said battery is above a predetermined threshold;

said second current falls below a predetermined threshold; and said first current limiter is not limiting said first current.

12. A power accessory for an electronic device and a rechargeable battery comprising:

a first current limiting means for limiting a first current derived from a supply current, said first current limiting means being connected between a power source and said electronic device; and a second current limiting means for limiting a second current derived from a supply current, said second current limiting means being connected between said first current limiting means and said battery;

wherein said first current limiting means allows said electronic device to pull current up to a peak current needed by said electronic device, and said second current limiting means provides remaining current to said battery to recharge said battery.

13. The power accessory of claim 12, wherein said power source comprises an AC/DC converting means connected to an AC current source for converting an AC supply current from said AC current source to a said supply current.

14. The power accessory of claim 12, wherein said second current limiting means controls said second current provided to said battery based on a pre-defined charging algorithm.

15. The power accessory of claim 12, wherein said second current limiting means interrupts said second current passing to said battery when said battery is fully charged.

16. The power accessory of claim 12, wherein said electronic device is a wireless telephone unit.

17. The power accessory of claim 12, wherein a current limit of said first current limiting means is different and greater than a current limit of said second current limiting means.

18. A power accessory for sharing current between loads comprising:

a first current limiting circuit connected between a power source and a first load; and a second current limiting circuit connected between said first current limiting circuit and a second load;

wherein said first current limiting circuit allows said first load to pull current up to a peak current needed by said first load, and said second current limiting circuit provides remaining current to said second load.

19. The power accessory of claim 18, wherein both said first and second loads are electronic devices.

20. The power accessory of claim 18, wherein both said first and second loads are battery packs.

* * * * *